United States Patent
Nieboer et al.

(10) Patent No.: US 7,089,204 B1
(45) Date of Patent: Aug. 8, 2006

(54) DOUBLE DUTCH AUCTION FOR ESTABLISHMENT AND MAXIMIZATION OF SALES PRICE OF GENERIC FUNGIBLE ITEMS

(75) Inventors: Robert Scott Nieboer, Nashville, TN (US); Pedro (Peter) V. Balcarce, Antioch, TN (US); Ivan N. Zhidov, Nashville, TN (US); Micah James Eldred, Nashville, TN (US); Vishnu V. Ram, Nashville, TN (US); Sreekanth Vemulapalli, Nashville, TN (US)

(73) Assignee: 5th Market, Inc., Nashville, TN (US)

( * ) Notice: Subject to any disclaimer, the term of this patent is extended or adjusted under 35 U.S.C. 154(b) by 689 days.

(21) Appl. No.: 09/624,076

(22) Filed: Jul. 24, 2000

Related U.S. Application Data

(63) Continuation-in-part of application No. 09/359,686, filed on Jul. 23, 1999, now Pat. No. 6,418,419.

(51) Int. Cl.
*G06Q 40/00* (2006.01)
(52) U.S. Cl. .......................................... 705/37; 705/35
(58) Field of Classification Search ................. 705/36, 705/37, 35
See application file for complete search history.

(56) References Cited

U.S. PATENT DOCUMENTS 6,035,289 A * 3/2000 Chou et al. .................. 705/37
6,078,906 A * 6/2000 Huberman .................... 705/37
6,269,343 B1 * 7/2001 Pallakoff ...................... 705/26
6,321,212 B1 * 11/2001 Lange .......................... 705/37
6,338,050 B1 * 1/2002 Conklin et al. ............... 705/26
6,418,419 B1  7/2002 Nieboer et al.

FOREIGN PATENT DOCUMENTS

EP    0 818 747 A2 *  1/1998

OTHER PUBLICATIONS

MilGrom, Paul, "Putting Auction Theory to Work: The Simultaneous Ascending Auction", Dec. 8, 1997.*

* cited by examiner

*Primary Examiner*—Jagdish N Patel

(57) ABSTRACT

A process and system that maximizes the sale price of a set of fungible items by allowing multiple independent parties to input purchase or sale orders for the items, which orders may be either dependent on or independent of the results of the maximization of the sale price of another set of fungible items for which multiple independent parties input purchase and sale orders that may be dependent on or independent of the results of the price maximization of a third set of items and where the price maximization of the secondary set of items may be dependent upon the result of the maximization of the first set of items and the maximization of the sale price of the third set of fungible items for which multiple independent parties input purchase and sale orders may be dependent upon the maximization of the sale price of the secondary set of items; thus allowing the sale price of up the three sets of fungible items to be interdependent.

24 Claims, No Drawings

DOUBLE DUTCH AUCTION FOR ESTABLISHMENT AND MAXIMIZATION OF SALES PRICE OF GENERIC FUNGIBLE ITEMS

CROSS-REFERENCE TO RELATED APPLICATIONS

This application is a continuation-in-part of Applicants' prior application Ser. No. 09/359,686 filed Jul. 23, 1999, assigned to the some assignee, which is now U.S. Pat. No. 6,418,419. The disclosure of that prior application is incorporated herein by reference.

BACKGROUND OF THE INVENTION

1. Field of the Invention

The present invention relates to a method and system for establishing and maximizing the price of fungible items through the use of two or more interdependent auctions of two or more sets of fungible items conducted substantially simultaneously. More specifically, the present invention relates to such a process and system implemented in an electronic trading network wherein the fungible items in preferred embodiments may be securities such as stocks, bonds and instruments related thereto.

2. Description of Background Art

Convertible bonds, by their nature, are sensitive to the common stock into which they are convertible (underlying securities). Many investors in convertible securities purchase them at the original issuance as well as in the secondary market. However, many potential investors in securities do not have the opportunity to purchase convertibles upon original issuance in a manner consistent with their investment philosophies, specifically hedge funds. In order to understand the uses of the invention, one must understand that increasing the number of potential buyers of an issue could have a positive impact on the ability of the issuer or underwriter to attain a higher price level and that each buyer will attempt to attain its own objectives.

Currently, new issues of convertible securities are managed by underwriters who are contracted by issuers to sell convertible securities on the issuers' behalf into the capital markets. Underwriters have many tools at their disposal when selling securities, salesmen, road shows, management's time, and relationships with customers among a few. Typically, at the end of the selling process, customers of the underwriter will indicate a level of interest in the securities by indicating the amount they would like to purchase. Some of these indications will be price sensitive and some will be noncompetitive. The underwriter and issuer decide the price of the newly issued securities and allocate the issue to buyers. Most securities are priced and allocated while the market is closed.

In the past few years, a new mechanism for issuing corporate securities has emerged: the Dutch auction. While the Federal Reserve Bank has used a similar process to issue government bonds for years, the process has been reinvented for corporate and municipal securities with the most recent offering being the auction of a municipal bond issue. The procedure involves the establishment of a single price for all allocations in a Dutch auction offering of securities. Generally, anyone bidding below the final price received no allocation and anyone bidding above the price receives a full allocation up to his indicated buy interest (those who were bidding the same price as the established price are given a proration.) Buyers can place multiple bids for different quantities at different prices. The issue price is established by searching for the first price in which the cumulative quantities for which bids at that price or higher equal or exceed the quantity to be sold in the auction.

Hedge funds in the convertible securities space are, by their nature, relative value participants. They attempt to purchase convertible securities when they believe they are cheap relative to the underlying common stock. When they make a purchase they generally sell or short the underlying stock in some "hedge" ratio in order to lock-in the value (cheapness) until the convertibles can be sold and the stock simultaneously re-purchased. These participants generally like to purchase convertibles while simultaneously selling the underlying common stock, but the new issue process, by its nature, precludes this practice. Firstly, the markets are closed when pricing occurs so they cannot sell or short the underlying common, and secondly, they are considered a less desirable buyer in any underwriting because of their after-market selling tendencies. Accordingly, a need in the art exists for a process that alleviates both problems provides the underwriter and issuer a more visible picture of demand for the new issue.

SUMMARY OF THE INVENTION

Accordingly, it is a primary object of the present invention to utilize multiple interdependent auctions for multiple potential buyers that will establish and maximize prices for fungible items such as new issues of securities offered by underwriters to multiple buyers in the respective auctions.

The objects of the present invention are fulfilled by providing a process for the establishment and maximization of the sale price of generic fungible items comprising the steps of:

conducting a primary auction for the sale of the generic fungible items based on purchase orders at fixed prices and/or conditional orders at prices contingent upon the sale of items in a second set of fungible items;

simultaneously conducting a secondary auction for the sale of said second set of fungible items; and completing sales in the primary auction based on sales results in the secondary auction thereby establishing and maximizing the sales price of said generic set of fungible items as an interdependent function of sales prices of the second set of fungible items.

The generic fungible item may be a new issue convertible bond of an underwriter and the second set of fungible items is common stock convertible with respect to the convertible bonds.

The process may further include the steps of:

conducting a tertiary auction simultaneously with the primary and secondary auctions for a third set of fungible items having contingencies relating to the sale of the generic fungible items and/or the second set of fungible items.

The conditional order are orders contingent upon the sale of items in the second set of fungible items are in the form of algorithms with constraints thereon that represent a willingness to transact, where price is a dependent variable of the algorithm within the constraints and the price of another security is an independent variable of the algorithm.

The objects of the present invention and specific embodiments thereof will become more readily apparent hereinafter.

DETAILED DESCRIPTION OF PREFERRED EMBODIMENTS

The system and process of the present invention for new issuances of convertible securities, dubbed Double Dutch, herein starts with a single Dutch-type auction where the "price" is the Conversion premium (the higher the conversion premium, the better for the issuers). Price can also be thought of as "conversion premium to the last trade" or "conversion premium to the print" where higher premium levels are more desirable to the issuers ("print" or "printed price" is the price of another security in a simultaneous auction). Any of these definitions of price would yield the same "order" of desirability for the issuer in the auction. What makes the auction of the present invention different is the potential reliance of some bids on the results of another auction. The auction of the present invention provides buyers the ability to enter orders for securities contingent upon selling other securities in another auction or contingent upon the price result of another auction. It also allows these buyers to create algorithms establishing the price and quantities they are willing to buy to be derived form the price quantities they receive from the other auction. In other words, one buyer may be willing to pay a 26% conversion premium for $1,000,000 bonds if he can short 30,000 shares of stock (the 26% is based upon the price of the short) and the auction of the present invention allows him to make that bid because we create another simultaneous auction for the underlying stock. If the price attainable for the underlying 30,000 of stock in the secondary auction would create a bid for the bonds in which he would be allocated bonds in the primary auction, securities would be provided as supply to the secondary auction. This simple view is complicated by multiple buyers with different hedge ratios intermingled with non-contingent bids in the primary auction yielding different quantities of supply to the secondary auction. Of some interest is the condition that the bidder in the primary auction who is bid is contingent on selling in the secondary or "underlying" auction may also wish to borrow the underlying securities if he makes a sale in the secondary auction; providing demand in a tertiary "stock loan" auction. Buyers of securities in the secondary auction, in this case, may be willing to loan securities in the tertiary auction thus providing supply to the tertiary stock loan auction. In this way, demand in the primary creates supply in the secondary and supply in the secondary creates demand in the tertiary while demand in the secondary auction creates supply in the tertiary auction. Of particular importance is the relationship of supply in one auction to the price result of another auction. This intertwines all auctions and requires a rules-based equilibrium to be established.

The main reason this has economic value is because new channels of demand are opened. One obvious channel is the hedge community and its willingness to enter the contingent orders, but a much larger and less obvious source of buyers comes from typical buyers of common stock (the demand side of the secondary auction). These bidders of common will have their bids "translated" to the primary auction into bids for bonds through the "stock sensitive" or "contingent" bidders in the primary auction. In other words, the bidders (and buyers) of common stock will buy the stock from those purchasers of bonds desiring to sell or short the stock in a simultaneous transaction to the purchase of their bonds from the underwriter.

EXAMPLES

Example A. A simultaneous interdependent process for the establishment and maximization of the sale price of generic fungible items where some of the purchase orders for these items rely upon a simultaneous sale of items belonging to a second set of generic fungible items in a secondary auction.

Example B. A simultaneous interdependent process for the establishment and maximization of the issue price and size (quantity) in a new issue convertible bond underwriting where some of the purchase orders for bonds rely upon a simultaneous sale of common stock in a secondary auction. This example is a specific use-care of Example A.

Example C. A multiple simultaneous interdependent process for the establishment and maximization of the issue price and size (quantity) in a new issue convertible bond underwriting where some of the purchase orders for bonds rely upon a simultaneous sale of common stock in a secondary auction and where some of the sale orders for stock in the secondary auction are not only contingent upon purchasing bonds in the primary auction, but are also contingent upon borrowing stock a tertiary stock loan auction in which some of the orders to lend stock in the tertiary auction are also contingent on the purchase of stock in the secondary auction.

Anyone skilled in the art will be able to use these examples and the related disclosure of the invention to extend or alter the process to allow for its use in transactions involving other financial instruments and non-financial items within the spirit and scope of the present invention.

Details of Example A

Supply: (Primary Auction)

A merchant wishes to sell 20 units of Product A using a Double-Dutch Auction.

Outright Demand: (Primary Auction)

Buyers of Product A in the Double Dutch auction are listed below.

| Buyer | Orders |
|---|---|
| #1 | This buyer is willing to pay $10.00 for one unit, $8.50 for two more units, and $7.50 for eight more units of Product A. |
| #2 | This buyer is willing to pay $9.00 for 3 units, and $7.75 for four more units of Product A. |
| #3 | This buyer is willing to pay $8.00 for 2 units, and $7.25 for three more units of Product A. |
| #4 | This buyer is willing to pay $7.00 for ten units of Product A. |

Sorted by price, this demand is represented in the following table. The last column is the cumulative demand quantity representing total purchase interest at or above that price. Notice that the total amount of "buy interest" at prices of $7.50 or above is 20 units of Product A.

TABLE A-1

| Buyer | Quantity (units) | Price | Cumulative Quantity |
|---|---|---|---|
| #1 | 1 | $10.00 | 1 |
| #2 | 3 | $9.00 | 4 |
| #1 | 2 | $8.50 | 6 |

TABLE A-1-continued

| Buyer | Quantity (units) | Price | Cumulative Quantity |
|---|---|---|---|
| #3 | 2 | $8.00 | 8 |
| #2 | 4 | $7.75 | 12 |
| #1 | 8 | $7.50 | 20 |
| #3 | 3 | $7.25 | 23 |
| #4 | 10 | $7.00 | 33 |

In a typical Dutch auction, the price for everyone would be $7.50. Buyer #1 would purchase eleven units, Buyer #2 would purchase seven units and Buyer #3 would purchase two units of Product A while Buyer #4 would be shutout. Had the selling merchant attempted to sell 10 units, the price would have been $7.50.

Contingent Demand: (Primary Auction)

Listed below are buyers who are willing to buy Product A if they can sell Product B.

TABLE A-2

| | Buy | | Sell | |
| Buyer | Quantity of Product A | Price of Product A | Quantity of Product B | Price of Product B |
|---|---|---|---|---|
| #4 | 6 units | $9.00 | 3 units | $16.00 |
| #5 | 2 units | $8.25 | 1 units | $14.00 |
| #6 | 4 units | $7.00 | 2 units | $16.00 |

Outright Demand: (Secondary Auction)

Buyers for Product B in the secondary auction are listed below:

TABLE A-3

| Buyer | Quantity | Price | Cumulative Quantity |
|---|---|---|---|
| #7 | 2 | $18.00 | 2 |
| #8 | 2 | $14.75 | 4 |
| #9 | 3 | $14.00 | 7 |

Electronic Matching of Supply with Demand:

A quick view of the auction landscape shows four buyers of Product A, three buyers of Product A if they can sell Product B, and three buyers of Product B in addition to our original merchant seller of 20 units of Product A.

Initially assume that the price of Product B will be the highest bid. Start at the top of Table A-3 with price of Product B at $18.00 and translate all of the bids in Table A-2 into bids for Product A using this assumed price result of the Product B auction. The following Table shows this translation.

TABLE A-2

| Buyer | Price of Product A | Quantity of Product A | Price of Product B | Quantity of Product B | Translated Price of Product A |
|---|---|---|---|---|---|
| #4 | $9.00 | 6 units | $16.00 | 3 units | $10.00 |
| #5 | $8.25 | 2 units | $14.00 | 1 units | $10.25 |
| #6 | $7.00 | 4 units | $16.00 | 2 units | $8.00 |

If Buyer #4 sells Product B at $18.00, he is willing to pay $10.00 for Product A (the extra profit from selling 3 units of Product B ($2.00 each) divided by the six units of Product A he wishes to purchase—3*($18.00–$16.00)/6+ $9.00=$10.00. If Buyer #5 sells Product B at $18.00, he is willing to pay $10.25 for Product A and if Buyer #6 sells Product B at $18.00 he is willing to pay $8.00 for Product A. These new values are be integrated with Table A-1 to create the following Table A4.

TABLE A-4

| Buyer | Price | Quantity Units | Cumulative Quantity | Quantity to be sold (Units of B) | Cumulative Qty. to be sold (Units of B) |
|---|---|---|---|---|---|
| #5 | $10.25 | 3 | 3 | 1 | 1 |
| #1 | $10.00 | 1 | 4 | | 1 |
| #4 | $10.00 | 6 | 10 | 3 | 4 |
| #2 | $9.00 | 3 | 13 | | 4 |
| #1 | $8.50 | 2 | 15 | | 4 |
| #3 | $8.00 | 2 | 17 | | 4 |
| #6 | $8.00 | 4 | 21 | 2 | 6 |
| #2 | $7.75 | 4 | 25 | | 6 |
| #1 | $7.50 | 8 | 33 | | 6 |
| #3 | $7.25 | 3 | 36 | | 6 |

If the auction price of Product B is $18.00, buyers #4, #5 and #6 have to sell 6 units of Product B. Supply outnumbers demand at this price and is inconsistent with the auction rules.

The next lower price in the Product B auction, $14.75, is examined in the same manner. This creates bids in the Product A auction of:

| Buyer | Price | Quantity | Cumulative Quantity | Units of B to be sold |
|---|---|---|---|---|
| #1 | $10.00 | 1 units | 1 | |
| #2 | $9.00 | 3 | 4 | |
| #5 | $8.50 | 3 | 7 | 3 |
| #1 | $8.50 | 2 | 9 | |
| #4 | $8.375 | 6 | 15 | 1 |
| #3 | $8.00 | 2 | 17 | |
| #2 | $7.75 | 4 | 21 | |
| #1 | $7.50 | 8 | 29 | |
| #3 | $7.25 | 3 | 32 | |
| #6 | $6.375 | 4 | 36 | 2 |

In addition, a quantity in the product B auction of four units. This matches with the demand at 14.75 for product B. The table below lists the results of both auctions by user. Price to all purchasers of product A is $7.75, and to all sellers and buyers of product B it is $14.75.

| Participant | Quantity A Purchased at $7.75 | Quantity B Purchased at $14.75 | Quantity B Sold at $14.75 |
|---|---|---|---|
| 1 | 3 units | | |
| 2 | 6 units | | |
| 3 | 2 units | | |
| 4 | 6 units | | 3 units |
| 5 | 3 units | | 1 units |
| 6 | | | |
| 7 | | 2 units | |
| 8 | | 2 units | |
| Total | 20 units | 4 units | 4 units |

Details of Examples B and C can be developed in a similar manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A computer-assisted process for the establishment and maximization of the sale prices of a generic set of fungible items comprising the steps of:
   conducting a primary auction for the sale of the generic set of fungible items based on purchase orders at fixed prices and/or conditional orders at prices contingent upon the sale of items in a second set of fungible items;
   simultaneously conducting a secondary auction for the sale of said second set of fungible items; and
   completing sales in the primary auction based on sales results in the secondary auction thereby establishing and maximizing the sales price of said generic set of fungible items as an interdependent function of sales prices of the second set of fungible items using a computer.

2. The process of claim 1 wherein the generic fungible item is a new issue convertible bond of an underwriter and the second set of fungible items are common stock convertible with respect to the convertible bonds.

3. The process of claim 1 including the further steps of:
   conducting a tertiary auction simultaneously with the primary and secondary auctions for a third set of fungible items having contingencies relating to the sale of the generic fungible items and/or the second set of fungible items.

4. The process of claim 2 including the further steps of:
   conducting a tertiary auction simultaneously with the primary and secondary auctions for a third set of fungible items having contingencies relating to the sale of the generic fungible items and/or the second set of fungible items.

5. The process of claim 4 wherein the tertiary fungible items are orders to loan stock, and sold orders may be contingent upon the purchase of stock in the secondary auction.

6. The process of claim 1 wherein sales prices of orders per unit are maximized as a function of order quantity electronically compared with quantities in orders within each respective simultaneous auction.

7. The process of claim 1 wherein the generic fungible items are security instruments, and the conditional order contingent upon the sale of items in the second set of fungible items are in the form of algorithms with constraints thereon that represent a willingness to transact, where price is a dependent variable of the algorithm within the constraints and the price of another security is an independent variable of the algorithm.

8. The process of claim 7 wherein the order price of a conditional order, as represented by the algorithm, includes an order quantity subject to another algorithm.

9. The process of claim 7 wherein the conditional order algorithm can be represented as a line in two dimensional space with constraints having the price of one security as one axis and the price of another security as its other axis.

10. The process of claim 7 wherein the instrument includes bonds.

11. The process of claim 7 wherein the instrument includes warrants.

12. The process of claim 7 wherein the instrument variable may include multiple independent variables.

13. The process of claim 7 wherein the instrument includes options.

14. The process of claim 7 wherein the instrument includes futures.

15. The process of claim 7 wherein the instrument includes forward contracts.

16. The process of claim 7 wherein the instrument includes swap contracts.

17. The process of claim 7 wherein the price of the conditional order may be a yield.

18. The process of claim 7 wherein the price of the conditional order may be in volatility.

19. The process of claim 7 wherein the price of the conditional order may be a yield spread.

20. The process of claim 7 wherein one of the conditions of the conditional order is the requirement that another security is traded contemporaneously.

21. The process of claim 7 wherein one of the conditions of the conditional order is that no transaction can occur when the independent price is above or below set limits.

22. The process of claim 7 wherein one of the conditions of the conditional order is that the price is not to exceed a specified level regardless of the results produced by the algorithm.

23. The process of claim 7 wherein one of the conditions of the conditional order is that the price is not to be less then a specified level regardless of the results produced by the algorithm.

24. The process of claim 7 wherein one of the conditions of the conditional order is the requirement that the orders be match/compared without use of prices fed from said external multiple exchanges.

* * * * *